Feb. 1, 1938.  J. GOGAN  2,107,113
HARDNESS TESTING MACHINE
Filed July 1, 1933  3 Sheets-Sheet 1

INVENTOR:
JOSEPH GOGAN

ATTORNEYS

Feb. 1, 1938.  J. GOGAN  2,107,113
HARDNESS TESTING MACHINE
Filed July 1, 1933   3 Sheets-Sheet 2

INVENTOR:
JOSEPH GOGAN
Kwis Hudson & Kent
ATTORNEYS

Feb. 1, 1938.    J. GOGAN    2,107,113
HARDNESS TESTING MACHINE
Filed July 1, 1933    3 Sheets-Sheet 3
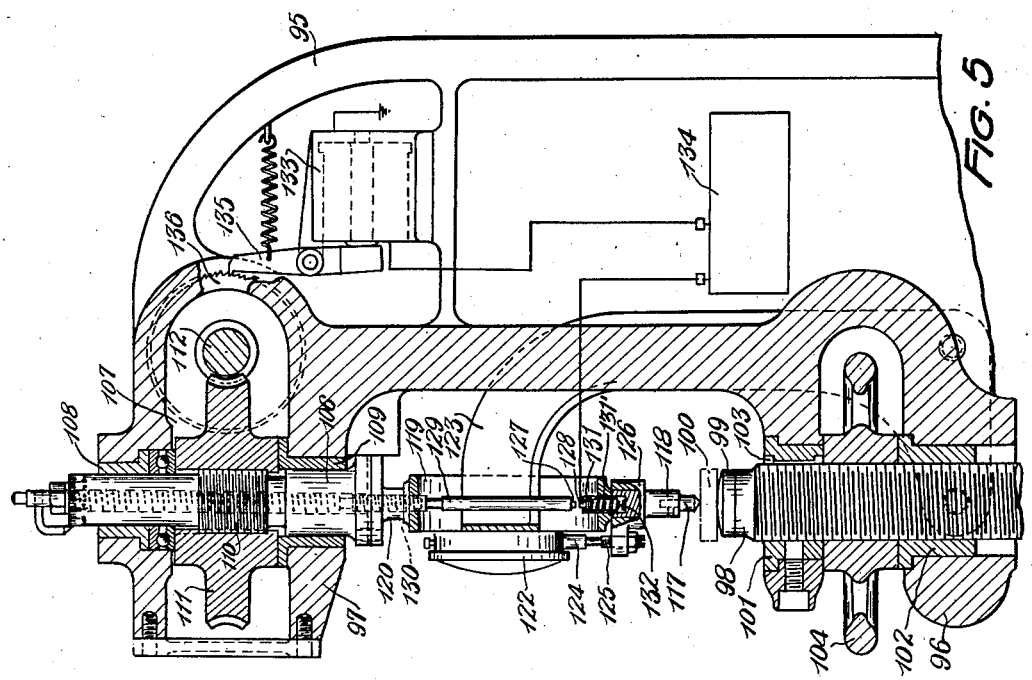
INVENTOR:
JOSEPH GOGAN
Kwin Hudson & Kent
ATTORNEYS Patented Feb. 1, 1938

2,107,113

UNITED STATES PATENT OFFICE 2,107,113

HARDNESS TESTING MACHINE

Joseph Gogan, Lakewood, Ohio

Application July 1, 1933, Serial No. 678,682

31 Claims. (Cl. 265—12)

This invention relates to testing apparatus and, more particularly, to improved apparatus of this kind for use in testing the hardness or other characteristics of individual bodies in such a manner that the usefulness of the bodies is not impaired or destroyed.

An object of the invention is to provide improved testing apparatus, of the type referred to, which is very simple as to construction and operation and by means of which extremely accurate test results can be obtained.

Another object of this invention is to provide improved testing apparatus having means for applying a distorting force to a test piece and indicating means for measuring the test piece distortion, and which embodies means for rendering the indicating means effective for measuring the test piece distortion, including flexible means through which the distorting force is transmitted and which is adapted to be deflected substantially proportionately with the magnitude of the force being transmitted.

Still another object of this invention is to provide improved testing apparatus having means for applying a distorting force to a test piece, and embodying means for preventing the distorting force from exceeding a desired predetermined value, the last means including flexible means through which the distorting force is transmitted and which is adapted to be deflected substantially proportionately with the magnitude of the force being transmitted, and control means actuated by the deflection of the flexible means.

A further object of this invention is to provide a hardness tester having a penetrator, and also having force applying means for causing said penetrator to distort a test piece, including a ring through which the distorting force is transmitted and which is adapted to be deflected substantially proportionately with the force being transmitted, and wherein controls, for a distortion indicator and the force applying means, are adapted to be actuated in succession by the deflection of said ring.

Still another object of this invention is to provide an improved testing machine of the type mentioned having means for applying a predetermined load to a test piece and means for indicating the test piece distortion corresponding with such predetermined load, and wherein controls for the indicating means and the force applying means are actuated in succession by deflection of a member through which the distorting force is transmitted, such that the indicator control is actuated by deflection of said member corresponding with a preliminary value of the distorting force and the control for the force applying means is actuated by distortion of said flexible means corresponding with a predetermined force in excess of said preliminary value.

It is also an object of this invention to provide a testing machine of the type having test piece distorting means and means for indicating the test piece distortion, but wherein the indicating means is such that the indication given does not include distortion produced in machine parts by the force being applied to the test piece.

Yet another object of this invention is to provide an improved testing machine, of the type mentioned, embodying a frame having test piece supporting means thereon and wherein the means for indicating the test piece distortion is supported from the test piece supporting means.

Other objects and advantages of the invention will be apparent from the following description when taken in conjunction with the accompanying sheets of drawings, wherein Fig. 1 is a front elevational view of a testing machine embodying my invention;

Fig. 4 is a front elevational view showing my invention embodied in a more simplified form of testing machine; and Fig. 5 is a sectional view thereof taken as indicated by line 5—5 of Fig. 4.

Figure 1:
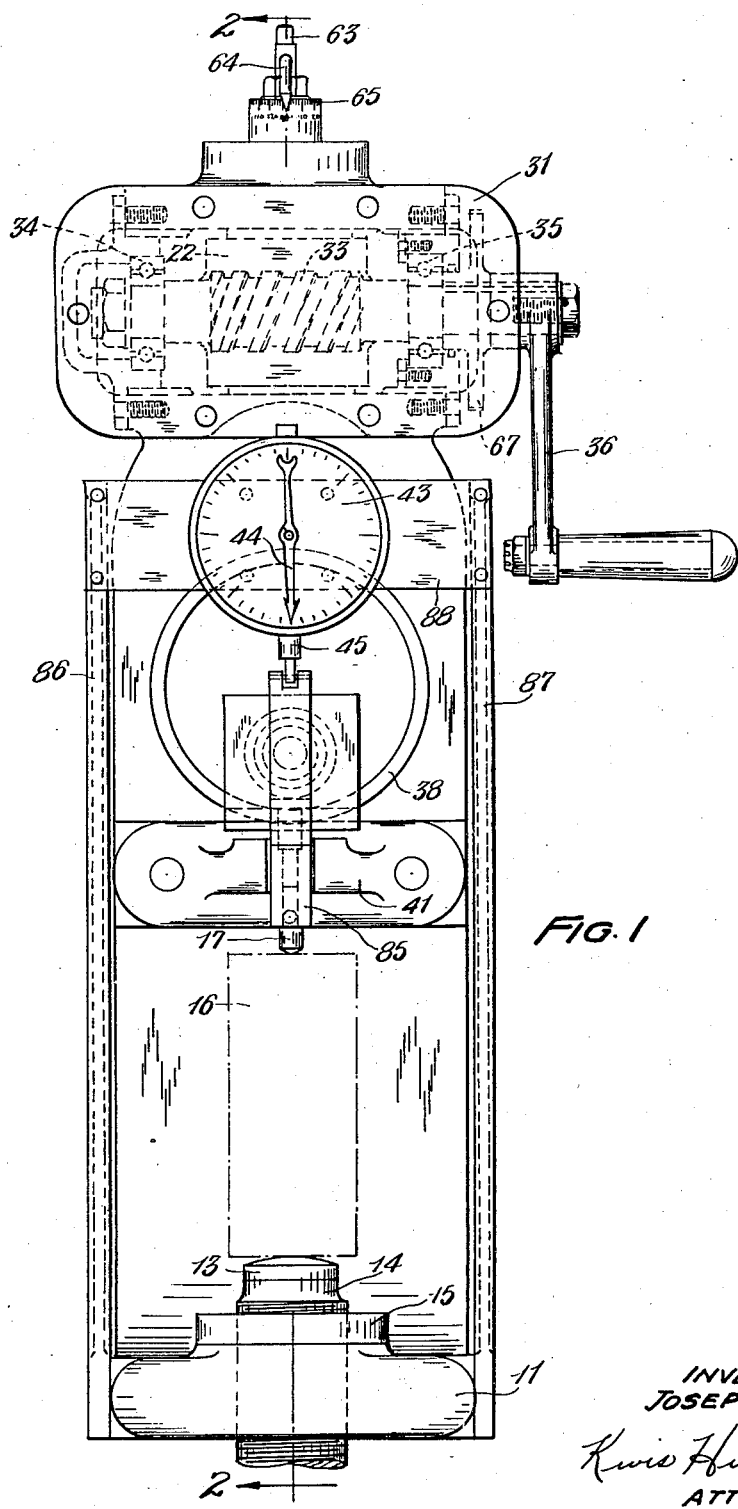

Detailed reference will now be made to the accompanying drawings illustrating my improved testing apparatus, which is of very simple construction but which is extremely accurate and which may be used for performing various tests on individual bodies without impairing the utility of such bodies. As will be explained more fully hereinafter, my improved testing apparatus may be used in making hardness tests on various bodies or machine parts. While I have illustrated what I now regard to be the preferred form of my testing apparatus, it will be understood, of course, that changes may be made in this apparatus and that the principle thereof may be embodied in various other arrangements and testing machines.

As shown in the drawings, my improved testing machine is provided with a frame 10 which, in this instance, is a frame of the gap type, although any other suitable form of frame may be employed. This frame is provided with a work supporting portion 11 and with a head 12 disposed in substantially vertically spaced relation above the work supporting portion. The frame may be adapted for mounting on any suitable supporting means.

The work supporting portion of the frame is provided with a hardened anvil 13 which may be of any suitable shape and which is mounted upon the upper end of an adjusting screw 14. This adjusting screw may be mounted in the work supporting portion of the frame, and may be raised or lowered for adjusting the anvil 13 to the desired height and may be clamped in any desired position of adjustment by the use of any suitable adjusting and clamping means of the prior art, such as that illustrated in my prior Patent No. 1,746,891, issued February 11, 1930.

A piece to be tested, such as the test piece 16, may be supported on the anvil 13 and if the test to be made is a hardness test, a test member in the form of a penetrator 17 is pressed against the test piece by force applying means which will now be described. Before proceeding with the description of the force applying means, it is pointed out that the penetrator 17 may be of any suitable form and, in some instances, may be a diamond-pointed penetrator and, in other cases, may be a Brinell ball.

For actuating the penetrator 17 to move the same toward or away from the test piece, and for applying a distorting force to the penetrator, I provide the frame 10 with a member or spindle 20 which is mounted in the head 12 and which is movable along a vertical axis substantially coincident with the axis of the adjusting screw 14. In this instance, the member 20 is in the form of a screw having a threaded portion 21 engaging in the threaded opening of a worm gear 22 and also having plain or unthreaded portions 23 and 24 which extend, respectively, above and below the threaded portion. These plain portions of the screw 20 are slidable respectively in suitable bushings 25 and 26 which are mounted in the head 12 of the frame. Adjacent the plain portion 24, the member 20 is provided with a flattened portion 27 which slidably engages a flat face on the projecting portion 28 of the frame so as to prevent the screw from turning with the gear member 22.

Figures 2, 3:
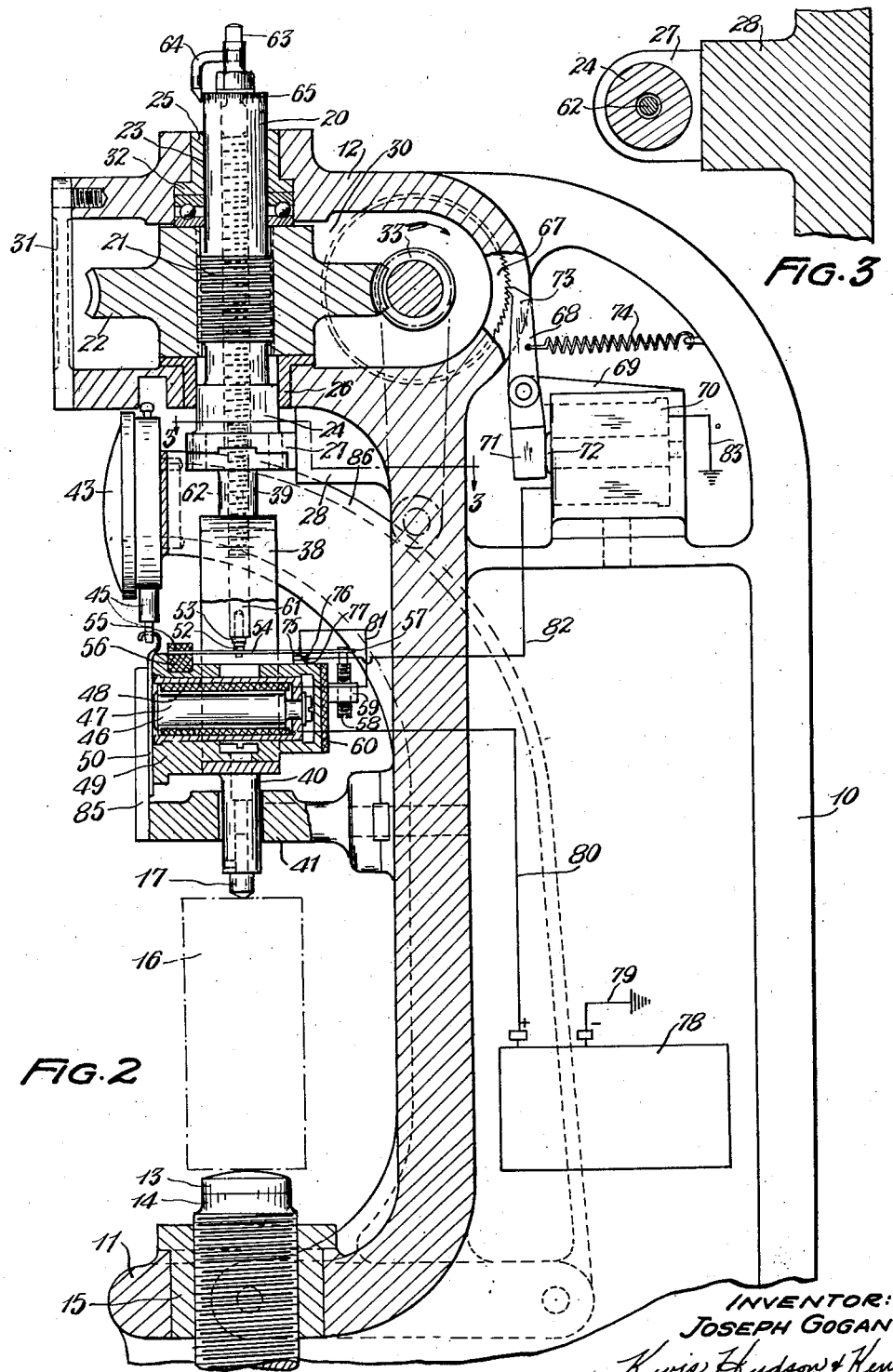
Fig. 2 is a sectional elevation of the machine taken substantially as indicated by line 2—2 of Fig. 1.
Fig. 3 is a partial transverse sectional view taken substantially as indicated by line 3—3 of Fig. 2.

The head of the frame is preferably constructed with a gear chamber 30 having a removable cover 31, and in which chamber the gear 22 is mounted. As shown in Fig. 2 of the drawings, the gear 22 may be arranged with the lower end of the hub thereof supported on a part of the frame, such as the bushing 26, and with the upper end of the hub engaging suitable thrust means such as the thrust bearing 32. A driving worm 33 may be supported in the gear chamber 30 in mesh with the gear 22, by means of suitable spaced bearings 34 and 35 so that, upon rotation of the worm, the gear 22 will be rotated and the screw 20 will be raised or lowered in the threaded opening of the gear, depending upon the direction of rotation of the worm 33. Any suitable means may be provided for actuating the worm and, in this instance, I show a hand crank 36 for this purpose.

For transmitting motion and distorting force from the screw 20 to the penetrator 17, I employ flexible means which constitutes an important part of my invention and which, as will be explained more fully hereinafter, is adapted to be deflected by the distorting force so as to exercise important control functions. This flexible means is preferably in the form of a resilient metal ring 38, as illustrated in the drawings, but flexible means of various other characteristics could be employed for this purpose. The ring 38 may be provided with a stem portion 39 for connecting the ring to the lower end of the screw 20, and may also be provided with a stem portion 40, which is substantially diametrically opposite the stem portion 39, for supporting the penetrator 17.

From the arrangement as thus far described, it will be seen that when the test piece is in position on the anvil 13 and the hand crank 36 is rotated in a clockwise direction as indicated in Fig. 2, the worm 33 will rotate the gear 22 causing the member 20 to be screwed downwardly through the hub of the gear. This downward movement of the member 20 causes the penetrator 17 to be moved into engagement with the test piece and, after contact of the penetrator with the test piece, causes a distorting force to be transmitted through the ring 38.

If desired, the frame of the machine may be provided with a suitable guide, in this instance, a laterally extending guide 41 through which the stem 40 of the ring extends.

In measuring the distortion produced in the test piece by the force applied thereto, and in preventing the distorting force from exceeding a desired predetermined value, I employ means which is actuated in response to the deflection produced in the ring 38, and such means will now be described. The means for indicating the distortion produced in the test piece includes an indicator or gauge 43. Since, in this instance, the test being performed on the piece 16 is a hardness test, the gauge 43 is a depth gauge and measures the distance which the penetrator 17 is pressed into the test piece. The gauge may be of any suitable construction, and is preferably of the type having a pointer 44 which is normally returned to a zero position by a spring contained in the gauge casing and which is adapted to be moved away from the zero position in opposition to the spring by downward movement of the gauge actuating stem 45.

For rendering the gauge responsive to movement of the penetrator 17 I provide an electromagnet 46, which is preferably, though not necessarily, mounted within the ring 38, as shown in Fig. 2 of the drawings. This electromagnet may be of any suitable construction, and is provided with a core 47 and with an energizing winding 48 disposed around the core. The core and energizing winding of the magnet are arranged in a suitable casing 49, so that the electromagnet constitutes a self-contained unit which may be mounted in the ring 38 preferably on the lower part thereof. A gauge operating member 50, preferably in the form of an elongated strip of magnetizable material, is loosely connected or hinged to the lower end of the gauge actuating stem 45, so as to extend in adjacent relation past the end of the magnet core 47.

As mentioned above, the electromagnet 46 is mounted on and moves with the ring 38, and it will thus be seen that when this magnet is energized, the gauge operating member 50 will be attracted and thereby releasably connected for movement with the ring and with the penetrator 17. Such movement of the gauge operating member 50 with the pentrator causes the gauge 43 to be actuated substantially proportionately to movement of the penetrator. When the electromagnet is deenergized the gauge operating member 50 is released and the penetrator may be moved up or down without the gauge 43 being actuated.

For controlling the energization of the electromagnet 46, I provide a pair of cooperating contacts 52 and 53, which contacts are preferably arranged within the ring 38 substantially at the center thereof. The contact 52 may be carried by a flexible member 54 which is mounted on the housing of the magnet 46. This latter contact is preferably mounted on the member 54 at a point intermediate its ends, and the ends of this member are, in turn, supported on the magnet housing, the end 55 being connected to the housing through an insulating block 56 and the end 57 being connected to the housing by an adjusting screw 58. The adjusting screw 58 extends through a threaded part 59 which is supported by the magnet housing, but insulated therefrom by the insulation 60.

The contact 53 is carried by a stem 61 which extends downwardly into the ring away from the connecting portion 39 and toward the magnet housing. For the purpose of adjusting the contact 53 relative to the contact 52, the stem 61 may be arranged to extend upwardly through the connecting portion 39 of the ring and through the movable member 20 of the force applying means. This stem 61 is provided with a threaded portion 62, which cooperates with a threaded section provided in the connection portion 39, so that by rotation of the stem 61 this part will be moved up or down within the opening of the member 20, and the contact 53 will be moved toward or away from the contact 52, depending upon the direction of rotation of the stem 61. The threads of the connecting portion 39 and of the threaded portion 62 are preferably of the same pitch as threads used in micrometers of conventional type, and the projecting end 63 of the stem 61 is preferably provided with indicating means, such as the reference pointer 64, which cooperates with other indicating means, such as the graduations 65, which may be provided on an adjacent part, for example, the upper end of the member 20.

The means for preventing the distorting force from exceeding a predetermined value, may be any suitable form of clutch, brake or other appropriate mechanism for rendering ineffective the means which causes the distorting force to be applied to the test piece. In this instance the means, for preventing the pressure of the penetrator 17 against a test piece, from exceeding a predetermined value, includes a ratchet or locking wheel 67, which is mounted on the shaft of the driving worm 33, and an electromagnetically actuated pawl 68, which cooperates with the locking wheel. The pawl 68 is preferably pivotally mounted on the housing 69 of an electromagnet 70, in such a manner that the end 71 of the pawl constitutes an armature for the electromagnet. When the electromagnet is energized, the end 71 is attracted and is moved toward the core 72 of the electromagnet, thereby swinging the end 73 of the pawl into position for engagement with the teeth of the locking wheel. Such engagement of the pawl with the locking wheel prevents further rotation of the worm 33 in a clockwise direction or, in other words, prevents further rotation of the screw in the direction necessary for causing distorting force to be applied to the test piece through the penetrator 17.

A spring 74, having its ends connected, respectively, to the pawl 68 and the frame 10, normally retracts the pawl from engagement with the locking wheel 67, so that the worm 33 may be rotated freely in either direction.

Energization of the electromagnet 70 may be controlled by a pair of contacts 75 and 76, which are associated with the ring 38, the contact 75 being carried by the flexible member 54, and the contact 76 being supported on the magnet housing 49 but insulated therefrom by the insulation 77.

A source of suitable energizing current, preferably direct current of a steady potential, is provided and, in this instance, is in the form of a storage battery 78. One terminal of the storage battery is grounded on the frame of the machine through the conductor 79. The other terminal of the storage battery may be connected to one end of the magnet winding 48 by a conductor 80. The other end of the winding 48 is connected to the member 54 by a conductor 81. One end of the winding of the electromagnet 70 may be connected with the stationary contact 76 by means of a conductor 82, and the other end of this electromagnet is grounded on the frame of the machine through a conductor 83.

Before entering into a detailed description of the operation of my improved apparatus, I wish to point out in a general way, that in making a test such as a hardness test, the penetrator 17 is first moved into engagement with the test piece and is pressed against the test piece with a preliminary force of relatively low value, but which is sufficient to penetrate dirt or scale adhering to the test piece. When this preliminary force is applied to the test piece by the penetrator, the electromagnet 46 is energized and the gauge 43 is connected to the penetrator, so that any further movement of the penetrator into the test piece will be measured or indicated by the gauge. The pressure between the penetrator and the test piece is then increased, causing the penetrator to move into the test piece, and when the pressure reaches a desired predetermined value, the electromagnet 70 is energized causing the driving worm 33 to be locked against further movement in a clockwise direction, thereby preventing the penetrator from being moved any farther into the test piece and also preventing the pressure on the penetrator from exceeding the desired predetermined value.

In the detailed operation of my improved testing machine, a piece to be tested, such as the piece 16, is supported on the anvil 13, and the penetrator 17 is moved downwardly into engagement with the test piece by rotation of the hand crank 36 in a clockwise direction, as seen in Fig. 2. This rotation of the crank 36 causes motion to be transmitted through the worm 33 and the gear 22 and causes the member 20 to move downwardly through the hub of the gear and to move the ring 38 and the penetrator 17 carried thereby downwardly toward the anvil 13. As soon as the penetrator engages the test piece, further downward movement of the penetrator is resisted by the test piece. Because of this resistance to movement of the penetrator which is offered by the test piece, the force being supplied through the member 20 causes the ring 38 to be deflected, such deflection being substantially proportional to the magnitude of the force being transmitted through the ring.

With the ring arranged as shown in the drawings, this deflection results in a shortening of that diameter of the ring which is substantially coincident with the vertical axis of the screw member 14 and the member 20. This shortening of the ring diameter causes the stem 61, and the contact 53 carried thereby, to be moved downwardly toward the contact 52. During this deflection of the ring the pressure applied to the penetrator increases, and when this pressure reaches the desired predetermined preliminary value mentioned above, the ring 38 will have been deflected sufficiently to cause the contact 53 to engage the contact 52, thereby closing the circuit of the magnet winding 48. The energization of this magnet winding causes the gauge actuating member 50 to be attracted and connected for movement with the penetrator.

As the pressure continues to increase the penetrator is forced into the test piece and such movement of the penetrator is indicated by the gauge 43. The increasing pressure acting on the penetrator also causes further deflection in the ring 38, or, in other words, causes a further shortening of the diameter of the ring. Since the contact 53 is already in engagement with the contact 52, such further shortening of the diameter of the ring 38 causes the member 54 to be deflected or shifted downwardly, thereby moving the contact 75 downwardly toward the contact 76. When the pressure being applied to the test piece reaches the desired predetermined value, which is in excess of the preliminary value, the deflection produced in the ring 38 by such predetermined force will have caused the contact 75 to move enough to engage the contact 76. The closing of the contacts 75 and 76 completes the energizing circuit for the electromagnet 70 and the pawl 68 is thereupon shifted in opposition to the spring 74 to the position shown in Fig. 2. In this position of the pawl the worm 33 is held against further clockwise movement, and further downward movement of the penetrator or increase in the distorting force above the desired predetermined value, is thereby prevented.

When the force applying means is rendered ineffective by the pawl 68, the movement of the penetrator is stopped and the indicating hand of the gauge stops at a reading indicating the amount which the test piece has been distorted by the predetermined pressure value. The machine operator then notes this reading of the gauge, which may be regarded as a direct indication of the hardness or other characteristic being tested in the test piece. As successive pieces are tested in the machine, the operator notes the reading of the gauge given for each piece and, if the variations noted in the gauge readings for particular pieces, exceed an allowed variation, such particular pieces are rejected as being either too hard or too soft.

Just before my improved testing machine is to be put into operation it is usually desirable that the control mechanism be checked for accuracy and, if necessary adjusted so that extremely accurate test results may be obtained. In making such a check of the control mechanism, the test member is moved upwardly to the open position and with the ring 38 in its normal or undistorted condition the operator rotates the adjusting screw 63 in a direction to move the contact member 53 downwardly into engagement with the contact 42. The amount of downward movement of the contact member 53 necessary to bring the same into engagement with the contact 52 is indicated in thousandths of an inch by the graduations 65 and represents the extent to which the ring 38 must be deflected by the preliminary distorting force. By continued rotation of the screw 63 further downward movement of the contact 53 causes the downward movement of the member 54, resulting in the contact 75 being moved into engagement with the contact 76. The total movement of the screw 63, as indicated in thousandths of an inch by the scale 65, necessary to cause the contact member 75 to engage the contact member 76 represents the total amount which the ring 38 is deflected by the distorting force when the secondary or total load is being applied to the test piece.

In making this check of the control mechanism the operator refers to a calibration chart which is furnished with the machine and which may be mounted on a convenient portion of the apparatus, such as on the plate 85 which covers and protects the electromagnet 46 and the gauge actuating member 50. This calibration chart is a chart previously prepared by accurate tests made on the ring 38 by subjecting the same to a series of different pressures and recording the corresponding deflections produced in the ring. By comparing the readings obtained from the scale 65 with the calibration chart, the operator is able to determine immediately the preliminary load value necessary to produce a closing of the contacts 52 and 53 and the total load value necessary to produce a closing of the contacts 75 and 76. If these pressure values do not correspond with the pressure values at which the machine should be operated, the screw 63 is adjusted until a setting is obtained such that the amount of ring deflection necessary to close the contacts 52 and 53 and the contacts 75 and 76 corresponds with the desired load values at which the machine is to be operated.

As just stated, the deflection of the ring necessary to cause the contact 53 to move into engagement with the contact 52 corresponds with the preliminary pressure or load being applied to the test piece, and the total movement of the contact 53 which is necessary to cause the contact 75 to engage the contact 76 corresponds with the secondary force or total load being applied to the test piece. By means of the adjusting screw 58 the contacts 52 and 75 can be adjusted, as to position, so that the ratio of the preliminary pressure to the total predetermined pressure can be varied to any desired value. If desired, the preliminary pressure can be eliminated entirely by adjusting the member 54 so that the contact 52 is engaged by the contact 53 substantially at the instant that the test member 17 engages the test piece.

As another feature of my invention I provide novel supporting means for the distortion indicating device, in this instance the gauge 43, so that the readings obtained from the indicator do not include the stretch or distortion which is produced in the machine frame, and in other parts, by the distorting force. In other words, I provide supporting means for the distortion indicator, such that the error corresponding with the stretch or distortion of the machine frame or other parts is eliminated from the indicator readings as tests are being made. This novel supporting means which I provide for the distortion indicator may assume different forms, depending on the design of the testing machine and the use to which it is to be put, and in this instance, I show my novel indicator mounting means applied to the gauge 43, and comprising upwardly extending brackets 86 and 87 for supporting the gauge from the portion of the machine which supports the test piece.

As shown in Figs. 1 and 2 of the drawings, the brackets 86 and 87 are connected to the supporting portion 11 of the frame and extend upwardly on opposite sides of the ring 38. A cross member 88 is connected to the upper ends of the brackets and the gauge 43 is mounted on this cross member, and thus, in effect, the gauge is supported from the same part of the machine as that upon which the test piece is supported. It will be understood, of course, that the brackets 86 and 87 may be of any suitable shape to position the gauge wherever it may be desired for cooperation with other parts of the apparatus, such as with the electromagnet 46. When the gauge is thus supported from the same part of the machine as that which supports the test piece, it will be seen that stretching or distortion produced in the frame of the machine does not cause a shifting of the gauge relative to the test piece support, such as has heretofore caused error in the gauge readings.

In Figs. 4 and 5 of the drawings I have shown my invention embodied in a more simplified form of testing machine. As shown in the drawings this simplified testing machine is provided with a suitable frame 95, having a work supporting portion 96 and a head portion 97 spaced thereabove. The work supporting portion of the frame is provided with an adjusting screw 98 having at its upper end an anvil 99 upon which a test piece 100 may be supported. The adjusting screw extending through suitable bushings 101 and 102 which are mounted in the frame, and may be prevented from turning by means of a key or spline 103 provided on the bushing or frame and engaging in a keyway of the screw. The adjusting screw also extends through a nut which is constructed in the form of a hand wheel 104 and is arranged so that upon rotation of the hand wheel the anvil 99 may be moved upwardly or downwardly relative to the head portion 97 of the frame.

A plunger 106 extends through a gear chamber 107 provided in the head portion of the frame and may be slidably mounted in suitable bushings 108 and 109. This plunger is provided with a threaded portion 110 which cooperates with a threaded opening formed in the hub of a gear 111 which is mounted in the chamber 107. A driving worm 112 mounted in suitable bearings 113 cooperates with the gear 111 to rotate the same and thereby cause the plunger to move up or down, depending upon the direction of rotation of the worm.

As in the case of the driving worm 33 shown in Fig. 2 of the drawings, the worm 112 may be actuated by any suitable means and, in this instance, I show the shaft of this worm as being provided with the pinion 113 which is engaged and rotated by vertical movement of a rack 114. The rack may be actuated by any suitable mechanism, such as the fluid pressure cylinder 115 to which pressure fluid may be admitted in a suitable manner to cause a desired upward or downward movement of the rack.

A test member 117 is mounted in a suitable chuck 118 and this chuck is connected to the plunger 106 by flexible means which, in this instance, is in the form of a metal ring 119 generally similar to the ring shown in Figs. 1 and 2. The ring may be connected to the plunger 106 by providing the ring with a flanged stem 120 which is located substantially diametrically opposite the stem formed by the chuck 118. The test member 117 may be a penetrator such as a Brinell ball or a diamond-pointed member, or may be a test member of any other form which is appropriate for the character of the test to be made. From the arrangement as thus far described, it will be seen that any distorting force which causes the test member 117 to be pressed against the test piece 100 is transmitted through the ring 119 and, since this ring is of a resilient character, distortion will be produced in the ring. In this instance the distortion produced in the ring is a shortening of its vertical diameter, corresponding substantially in extent with the value of the force being transmitted through the ring.

For measuring the distortion produced in the test piece, in this case the extent to which the penetrator 17 is pressed into the piece 100, I provide an indicator or gauge 122 which is preferably arranged adjacent the ring 119 and is supported from the portion of the frame which supports the test piece, as by means of spaced brackets 123. As explained above in connection with Figs. 1 and 2, the supporting of the gauge from that portion of the frame which supports the test piece eliminates from the gauge reading that factor of error which corresponds with the stretch produced in the frame by the distorting force. This gauge may be of any suitable construction and is provided with a pointer 123, and with an actuating stem 124 which projects from the casing of the gauge. The gauge is also provided interiorly thereof with a spring tending to rotate the pointer 123 in a direction which may be referred to as a "plus" direction relative to the zero or initial position, and which also tends to cause the stem 124 to be moved outwardly with respect to the gauge casing and to be held against an adjusting screw 125. This adjusting screw is threaded in a small bracket 126 which is carried by the lower stem of the ring 119.

When a test is to be made a test piece, such as the piece 100, is placed on the anvil 99 and the hand wheel 104 is rotated in a direction to cause the screw 98 to be moved upwardly. This upward movement of the screw causes the test piece to be pressed against the test member 117, thereby causing the ring 119 to be initially distorted or deflected by the application of a preliminary distorting force or load. Since the gauge 122 is held stationary by the bracket 123, the upward movement of the stem 118 and of the screw 125 causes the gauge stem 124 to be moved upwardly an amount corresponding with the extent to which the ring has been deflected by the preliminary load. This movement of the gauge stem 124 causes the pointer 123 to be rotated in what may be termed a "minus" or reverse direction. With the proper initial setting of the gauge corresponding with a desired preliminary load value, this reverse rotation of the gauge pointer causes the latter to approach the zero position of the gauge scale and when the zero position is reached the operator then knows that the desired preliminary load has been applied to the test piece by the deflection produced in the ring 119.

For applying the main distorting load to the test piece, pressure fluid is then admitted to the cylinder 115 to cause the screw 112 to be rotated by the rack 114. Rotation of the screw 112 causes rotation of the gear 111 which, in turn, causes the plunger 106 to be moved downwardly, thereby applying the main distorting load to the test member 117 through the ring 119. As the test member is pressed into the test piece the screw 125 moves downwardly with the test member or, in other words, moves downwardly away from the gauge 122. The spring contained in the gauge casing causes the gauge stem 124 to move downwardly with the screw 125, with the result that the gauge pointer 123 indicates, as in thousandths of an inch, the extent to which the test member or penetrator 117 moves into the test piece.

To indicate to the operator when the desired value of the main distorting force or load has been applied to the test piece, I provide the ring with a pair of cooperating contacts 127 and 128, which govern the operation of an electrical signal or control device as will be presently explained. The contact 127 is mounted on a stem 129 which extends upwardly through the plunger 106 and which is adapted to be adjusted relative to the plunger by means of a threaded portion 130, similar to the threaded portion 62 of the corresponding stem provided in the apparatus of Figs. 1 and 2. The contact 128 is carried by a plunger 131 which is slidable in a bushing 131' such bushing being formed of insulating material and mounted in the stem 118. A spring 132 arranged beneath the plunger 131 but insulated therefrom as by means of an insulating washer, normally holds the contact 128 in a desired relatively stationary position but permits downward movement of this contact after the latter is engaged by the contact 127.

When the distorting force being applied to the test piece reaches the desired predetermined value, the corresponding deflection produced in the ring 119 causes the contact 127 to engage the contact 128, thereby closing the circuit of the electrical signal or control device, in this instance, an electromagnet 133, so that energizing current is supplied to the device from a suitable source of current supply, such as the storage battery 134. The energizing of the magnet 133 causes the pawl 135 to be moved into locking cooperation with a ratchet wheel 136, to thereby prevent further rotation of the screw 112. The stopping of the screw 112 prevents further downward movement of the plunger 106, thus rendering the force applying means ineffective and preventing the distorting force, which is being applied to the test piece, from exceeding the desired predetermined value. The operator then notes the reading of the gauge 122, which reading is a measurement of the distance which the penetrator 117 has been pressed into the test piece by the predetermined load, and this reading may be regarded as a direct indication of the hardness, or other characteristics, of the piece being tested.

From the foregoing description and the accompanying drawings it will now be readily seen that I have provided an improved form of testing apparatus, wherein the distorting force which is applied to a test piece can be accurately predetermined, and wherein the distortion produced in a test piece by such predetermined force can be very accurately measured. In this improved apparatus the deflection of the flexible means, in this instance the deflection of the ring, is substantially proportional to the value of the distorting force or test load being transmitted through the flexible means, and since this condition always prevails without material variation, I am able to utilize this deflection of the flexible means for accurately controlling the indicating mechanism and for applying a test load of exact predetermined value to the test piece.

It will be seen, moreover, that since the test load is applied through the flexible means, and since the value of the test load is determined by the deflection produced in the flexible means, substantially all objectionable frictional factors heretofore present in testing machines, have been eliminated, and the only friction affecting the accuracy of tests made by my improved apparatus is the internal friction in the metal of the ring, and this fractional element is a negligible factor.

While I have illustrated and described my novel testing apparatus in a detailed manner and with particular reference to hardness testing, it will be understood, of course, that I do not wish to be limited to the precise details of construction and arrangement of parts illustrated and described, nor to the use of my invention only for hardness testing, but I regard my invention as including such changes and modifications as come within the scope of the appended claims, and as being applicable to various other testing operations.

Having thus described my invention I claim:

1. In testing apparatus the combination of a test piece support, a test member, said support and test member being relatively movable, means for causing said support and test member to apply distorting force to a test piece during a portion of such relative movement including flexible means through which the distorting force is transmitted and which is deflected substantially proportionately to the magnitude of the distorting force, means for measuring test piece distortion, and means responsive to a predetermined deflection of said flexible means for rendering the distortion measuring means effective.

2. In testing apparatus the combination of a test piece support, a test member, said support and test member being relatively movable, means for causing said support and test member to apply distorting force to a test piece during a portion of such relative movement including flexible means through which the distorting force is transmitted and which is deflected substantially proportionately to the magnitude of the distorting force, means for measuring test piece distortion, means responsive to a primary predetermined deflection of said flexible means for rendering the distortion measuring means effective, and means responsive to a secondary predetermined deflection of said flexible means for rendering the force applying means ineffective.

3. In testing apparatus the combination of a test piece support, a test member, means for causing relative movement between said support and said test member for applying distorting force to a test piece, said means including flexible means through which the distorting force is transmitted and which is flexed substantially proportionately with the magnitude of the distorting force, indicating means, means actuated by a flexing of said flexible means corresponding with a preliminary value of said force for rendering said indicating means responsive to said relative movement, and means actuated by a flexing of said flexible means corresponding with a predetermined value of said force in excess of said preliminary value for rendering the first mentioned means ineffective.

4. In testing apparatus the combination of a test piece support, a test member, means for causing relative movement between said support and said test member for applying distorting force to a test piece, said means including flexible means through which the distorting force is transmitted and which is deflected substantially proportionately to the magnitude of the distorting force, an indicator having an actuating member, an electromagnet for rendering the indicator actuating member responsive to said relative movement, an energizing circuit for said electromagnet, and switch means for said circuit which is actuated by a predetermined deflection of said flexible means.

5. In testing apparatus the combination of a test piece support, a test member, means for causing relative movement between said support and said test member for applying distorting force to a test piece, said means including flexible means through which the distorting force is transmitted and which is deflected substantially proportionately to the magnitude of the distorting force, an indicator having an actuating member, an electromagnet for rendering the indicator actuating member responsive to said relative movement, an energizing circuit for said electromagnet, switch means for said circuit which is actuated by a primary predetermined deflection of said flexible means, and means responsive to a secondary predetermined deflection of said flexible means for preventing the distorting force from exceeding a predetermined value.

6. In testing apparatus the combination of a test piece support, a test member, means for causing relative movement between said support and said test member for applying distorting force to a test piece, said means including a force applying means and a resilient ring device through which the distorting force is transmitted and which is deflected substantially proportionately to the magnitude of the distorting force, an indicator, means actuated by deflection of the ring device for establishing an operative connection between the indicator and the ring device whereby the indicator measures the test piece distortion produced by the force transmitted through the ring device, and means actuated in response to deflection of said resilient ring device corresponding with a predetermined test load value for controlling said force applying means.

7. In testing apparatus the combination of a test piece support, a test member, means for causing relative movement between said support and said test member for applying distorting force to a test piece, said means including a resilient ring device through which the distorting force is transmitted and which is deflected substantially proportionately to the magnitude of the distorting force, indicating means for measuring the extent of test piece distortion, and means inside said ring actuated by the deflection thereof for rendering said indicating means responsive to the relative movement between said support and said test member corresponding with the distortion of the test piece.

8. In testing apparatus the combination of a test piece support, a test member, means for causing relative movement between said support and said test member for applying distorting force to a test piece, said means including a resilient ring through which the distorting force is transmitted and which is deflected substantially proportionately to the magnitude of the distorting force, indicating means for measuring the extent of test piece distortion, and means inside said ring substantially at the center thereof and arranged to be actuated by deflection of the ring for rendering said indicating means responsive to the relative movement between said support and said test member corresponding with the distortion of the test piece.

9. In testing apparatus the combination of a test piece support, a test member, means for causing relative movement between said support and said test member for applying distorting force to a test piece, said means including a resilient ring through which the distorting force is transmitted and which is deflected substantially proportionately to the magnitude of the distorting force, an indicator, means for actuating said indicator, electrical means for rendering the indicator actuating means responsive to relative movement between said support and said test member, and a control for said electrical means disposed in said ring and actuated by deflection of the latter.

10. In testing apparatus the combination of a test piece support, a test member, means for causing relative movement between said support and said test member for applying distorting force to a test piece, said means including a resilient ring through which the distorting force is transmitted and which is deflected substantially proportionately to the magnitude of the distorting force, an indicator, means for actuating said indicator, electrical means for rendering the indicator actuating means responsive to relative movement between said support and said test member including an electromagnet and a circuit for said electromagnet, and a switch disposed in said ring and arranged to be actuated by deflection of the latter for controlling said circuit.

11. In testing apparatus the combination of a test piece support, a test member, means for causing relative movement between said support and said test member for applying distorting force to a test piece, said means including a resilient ring through which the distorting force is transmitted and which is deflected substantially proportionately to the magnitude of the distorting force, an indicator, means for actuating said indicator, electrical means for rendering the indicator actuating means responsive to relative movement between said support and said test member, a control for said electrical means disposed in said ring and which is actuated by deflection of the ring corresponding with a preliminary value of said force, and means for rendering the first mentioned means ineffective including control means actuated by deflection of the ring corresponding with a predetermined value of said force in excess of said preliminary value.

12. In testing apparatus the combination of a test piece support, a test member movable relative to said support, force applying means for causing distortion of a test piece by said test member during such relative movement including flexible means through which the force is transmitted and which is flexed substantially proportionately to the magnitude of the force being transmitted, an indicator for measuring the extent of test piece distortion, said indicator having an actuating member, means for operatively connecting the indicator actuating member with said test member including means which is actuated by a predetermined flexing of the flexible means, and means actuated in response to deflection of said flexible means corresponding with a predetermined test load value for controlling said force applying means.

13. In testing apparatus the combination of a test piece support, a test member movable relative to said support, means for actuating said test member to cause distortion of a test piece including a flexible member through which distorting force is transmitted and which is deflected substantially proportionately with the magnitude of the force transmitted, an indicator having an actuating member, an electromagnet for operatively connecting said indicator actuating member for movement proportionately with said test member, and a control for said electromagnet which is actuated by deflection of said flexible member corresponding with a predetermined value of said force.

14. In testing apparatus the combination of a test piece support, a test member movable relative to said support, means for actuating said test member to cause distortion of a test piece including a flexible member through which distorting force is transmitted and which is deflected substantially proportionately with the magnitude of the force transmitted, an indicator having an actuating member, an electromagnet for operatively connecting said indicator actuating member for movement proportionately with said test member, a control for said electromagnet which is actuated by deflection of said flexible member corresponding with a predetermined value of said force, and means for preventing the applied force from exceeding a predetermined value including means actuated by deflection of said flexible member corresponding with a predetermined value of said force in excess of the first mentioned predetermined value.

15. In testing apparatus the combination of a test piece support, a test member movable relative to said support, means for actuating said test member to cause distortion of a test piece including a flexible ring through which distorting force is transmitted and which is deflected substantially proportionately with the magnitude of the force transmitted, an indicator having an actuating member, an electromagnet movable with said ring for operatively connecting said indicator actuating member for movement substantially proportionately with said test member, and control means for said electromagnet disposed in said ring and which is actuated by deflection of said ring corresponding with a predetermined value of said force.

16. In testing apparatus the combination of a test piece support, a test member movable relative to said support, means for actuating said test member to cause distortion of a test piece including a flexible ring through which distorting force is transmitted and which is deflected substantially proportionately with the magnitude of the force transmitted, an electromagnet mounted in said ring for movement therewith, an indicator having an actuating member extending adjacent said electromagnet and adapted to be connected by the latter for movement proportionately with said test member, and contact means controlling said electromagnet including a switch member which is moved to closed position by deflection of said ring corresponding with a predetermined force being transmitted therethrough.

17. In testing apparatus the combination of a test piece support, a test member movable relative to said support, means for actuating said test member to cause distortion of a test piece including a flexible ring through which distorting force is transmitted and which is deflected substantially proportionately with the magnitude of the force transmitted, an electromagnet mounted in said ring for movement therewith, an indicator having an actuating member extending adjacent said electromagnet and adapted to be connected by the latter for movement proportionately with said test member, a contact element mounted on said electromagnet, and a contact element which is moved by deflection of said ring to engage the first mentioned contact when the force transmitted through the ring reaches a predetermined value.

18. In testing apparatus the combination of a test piece support, power means including a part movable relative to said support, flexible means carried by said part, a test member for engagement with a test piece, said flexible means being arranged to transmit force to said test member and to be deflected substantially proportionately with the magnitude of the force being transmitted, an indicator for measuring test piece distortion, means for rendering said indicator responsive to movement of said test member during a portion of its stroke including control means which is actuated by a predetermined deflection of said flexible means, and means actuated in response to deflection of said flexible means corresponding with a predetermined test load value for controlling said power means.

19. In testing apparatus the combination of a test piece support, power means including a part movable relative to said support, a ring connected to said part, a test member connected to said ring substantially diametrically opposite the connection with said part, said ring being adapted to transmit force to said test member and to be deflected substantially proportionately to the magnitude of the force being transmitted, an indicator, electromagnetic means for rendering said indicator responsive to movement of said test member, and a control for said electromagnetic means which is actuated by deflection of said ring.

20. In testing apparatus the combination of a test piece support, a test member, means for causing relative movement between said support and said test member for applying distorting force to a test piece, said means including flexible means through which the distorting force is transmitted and which is deflected substantially proportionately to the magnitude of the force being transmitted, an indicator, electrical means for rendering said indicator responsive to said relative movement, a control for said electrical means including cooperating contacts one of which is actuated by deflection of said flexible means, and means for adjusting one of said contacts.

21. In testing apparatus the combination of a test piece support, a test member, means for causing relative movement between said support and said test member for applying distorting force to a test piece, said means including flexible means through which the distorting force is transmitted and which is deflected substantially proportionately to the magnitude of the force transmitted, an indicator having an actuating member, an electromagnet movable proportionately to said relative movement and arranged to attract said actuating member for rendering said indicator responsive to said relative movement, and a control for said electromagnet actuated by deflection of said flexible means.

22. In testing apparatus the combination of a test piece supporting member, a test member, said members being adapted for relative movement substantially along an axis which is common to both members, means for causing such relative movement for applying distorting force to a test piece, said means including a ring through which the distorting force is transmitted and which is adapted to be deflected substantially proportionately with the magnitude of the force being transmitted, said ring being disposed with a diameter thereof substantially coincident with said axis, an indicator, electrical means for rendering said indicator responsive to said relative movement, and a control for said electrical means adapted to be actuated by deflection of said ring, said control including cooperating contacts supported from opposite sides of the ring and disposed substantially on said diameter.

23. In testing apparatus the combination of a test piece supporting member, a test member, said members being adapted for relative movement, means for causing such relative movement for applying a distorting force to a test piece, said means including a ring through which the distorting force is transmitted and which is adapted to be deflected substantially proportionately with the magnitude of the force being transmitted, an indicator, electrical means for rendering said indicator responsive to said relative movement, means for stopping said relative movement when said distorting force reaches a predetermined value, electrical means for actuating said stopping means, and pairs of cooperating contacts for controlling the respective electrical means, said pairs of contacts being adapted to be closed in succession by deflection of said ring.

24. In testing apparatus the combination of a test piece supporting member, a test member, said members being adapted for relative movement, means for causing such relative movement for applying a distorting force to a test piece, said means including a ring through which the distorting force is transmitted and which is adapted to be deflected substantially proportionately with the magnitude of the force being transmitted, an indicator, electrical means for rendering said indicator responsive to said relative movement, means for stopping said relative movement when said distorting force reaches a predetermined value, electrical means for actuating said stopping means, pairs of cooperating contacts for controlling the respective electrical means, said pairs of contacts being adapted to be closed in succession by deflection of said ring, and a movable member constituting a common support for one contact of each of said pairs.

25. In testing apparatus the combination of a frame having a test piece support thereon, a member movable on said frame relative to said support, a ring connected to said movable member, a penetrator carried by said ring and adapted to be pressed into a test piece by force transmitted through said ring, an indicator, electrical means for rendering said indicator responsive to movement of said test member into said test piece, a control for said electrical means including cooperating contacts, one of which is adapted to be actuated by deflection of said ring, and means extending through said movable member for adjustably supporting said one contact.

26. In testing apparatus the combination of a frame having a test piece support thereon, a test member, a gear rotatably mounted on said frame and having a threaded opening therein, a screw extending into said threaded opening and adapted to be moved relative to said support by rotation of said gear, a ring connecting said test member with said screw and through which distorting force is transmitted, an indicator, electrical means for rendering said indicator responsive to movement of said test member, contact means adapted to be actuated by deflection of said ring for controlling said electrical means, means for causing rotation of said gear, electrical means for stopping said rotation and other contact means adapted to be actuated by deflection of said ring for controlling the last mentioned electrical means.

27. In testing apparatus the combination of a frame having relatively movable members adapted to receive a specimen therebetween, power means operable for causing said members to apply a test load to said specimen, one of said members comprising a resilient ring device through which the test load is transmitted, a depth gage, bracket means extending from the other of said members for supporting the gage adjacent said ring device, means for actuating said gage in response to relative movement between said members for measuring specimen distortion, and means electrically controlling said power means including a switch adapted to be actuated upon a predetermined deflection of said ring device.

28. In testing apparatus the combination of a frame having an anvil and a spindle movable relative to said anvil, a penetrator for engagement with a specimen to be tested, power means operable for applying a test load to said spindle, a resilient ring device associated with said spindle and penetrator and through which the test load is transmitted, a depth gage, bracket means extending from the anvil supporting portion of the frame for supporting the gage adjacent said ring device, means for actuating said gage in response to relative movement between said spindle and anvil for measuring specimen distortion, and means electrically controlling said power means including a switch disposed in the ring device and adapted to be actuated upon a predetermined deflection of said resilient ring device.

29. The combination with a machine including a test ball holder and means for applying pressure thereon, of an indicator, means for supporting said indicator independently of said machine, a member slidable axially of said test ball holder and connected to said indicator, and means adapted to be rendered operative by movement of said test ball holder for connecting said slidable member to move with said test ball holder.

30. In combination with a mechanism comprising a penetrator and movable means operable for applying pressure thereto, an indicator, means for supporting said indicator independently of said mechanism, a member connected with the indicator and movable relative to the penetrator, and means adapted to be rendered operative by relative movement between the pressure applying means and the penetrator for connecting said member to move with the penetrator.

31. In a testing machine the combination of a penetrator, an actuating spindle, means yieldably connecting said penetrator and spindle, an indicator, a member connected with the indicator and movable relative to the penetrator, and means adapted to be rendered operative by relative movement between said spindle and penetrator for connecting said member to move with the penetrator.

JOSEPH GOGAN.